United States Patent
Schroeter (10) Patent No.: US 9,577,433 B2
(45) Date of Patent: Feb. 21, 2017

(54) ENERGY SUPPLY NETWORK FOR AN AIRCRAFT OR SPACECRAFT, METHOD FOR SUPPLYING ELECTRICAL LOADS WITH ENERGY, AND AIRCRAFT OR SPACECRAFT

(75) Inventor: Torben Schroeter, Jork (DE)

(73) Assignee: Airbus Operations GmbH, Hamburg (DE)

(*) Notice: Subject to any disclaimer, the term of this patent is extended or adjusted under 35 U.S.C. 154(b) by 899 days.

(21) Appl. No.: 13/988,890

(22) PCT Filed: Nov. 22, 2011

(86) PCT No.: PCT/EP2011/070641
§ 371 (c)(1),
(2), (4) Date: Aug. 6, 2013

(87) PCT Pub. No.: WO2012/069453
PCT Pub. Date: May 31, 2012

(65) Prior Publication Data
US 2013/0310994 A1    Nov. 21, 2013

(30) Foreign Application Priority Data

Nov. 22, 2010  (DE) .................... 10 2010 061 721

(51) Int. Cl.
 *B64D 41/00* (2006.01)
 *H02J 4/00* (2006.01)
 *H02J 3/36* (2006.01)

(52) U.S. Cl.
 CPC ............... *H02J 4/00* (2013.01); *B64D 41/00* (2013.01); *B64D 2221/00* (2013.01); *H02J 3/36* (2013.01); *Y02T 50/44* (2013.01)

(58) Field of Classification Search
 CPC ............... B64D 2221/00; B64D 41/00; B64D 2041/002; B64D 2041/005; H02J 4/00; Y02T 50/52
(Continued)

(56) References Cited

U.S. PATENT DOCUMENTS

2005/0077886 A1* 4/2005 Cester ................... H02M 5/272
                                                        323/355
2008/0174177 A1* 7/2008 Langlois .................. H02J 1/08
                                                        307/9.1
(Continued)

FOREIGN PATENT DOCUMENTS

JP      2007015423     1/2007
WO      2009125007     10/2009
(Continued)

OTHER PUBLICATIONS

International Search Report, Apr. 12, 2012.
German Search Report, Nov. 22, 2010.

*Primary Examiner* — Ronald Hartman, Jr.
(74) *Attorney, Agent, or Firm* — Greer, Burns & Crain Ltd.

(57) ABSTRACT

An energy supply network for an aircraft or spacecraft, comprising at least one energy generating device for generating electrical energy, comprising at least two energy control devices, at least one of which is coupled directly to at least one of the energy generating devices and which are adapted each to provide a controlled supply voltage so as to supply electrical loads located in the aircraft with energy, and comprising a high-voltage direct current transmission device, which couples the at least two energy control devices to one another by means of high-voltage direct current transmission. Further, a method for supplying energy, and an aircraft or spacecraft.

14 Claims, 4 Drawing Sheets

(58) Field of Classification Search
USPC ............................... 700/286, 297; 244/53 R
See application file for complete search history.

(56) References Cited

U.S. PATENT DOCUMENTS

| | | | | |
|---|---|---|---|---|
| 2010/0019568 A1* | 1/2010 | Stolte | ..................... | B64D 41/00 |
| | | | | 307/9.1 |
| 2010/0080030 A1 | 4/2010 | Wiegman et al. | | |
| 2010/0156171 A1* | 6/2010 | Sechrist | ..................... | H02J 1/08 |
| | | | | 307/9.1 |
| 2010/0193629 A1* | 8/2010 | Breit | ..................... | B64D 11/02 |
| | | | | 244/58 |
| 2010/0293959 A1* | 11/2010 | Remy | ....................... | F02C 3/22 |
| | | | | 60/773 |
| 2010/0316928 A1* | 12/2010 | Westenberger | ........ | B64D 41/00 |
| | | | | 429/452 |

FOREIGN PATENT DOCUMENTS

| | | |
|---|---|---|
| WO | 2009125012 | 10/2009 |
| WO | 2009125013 | 10/2009 |

\* cited by examiner

ENERGY SUPPLY NETWORK FOR AN AIRCRAFT OR SPACECRAFT, METHOD FOR SUPPLYING ELECTRICAL LOADS WITH ENERGY, AND AIRCRAFT OR SPACECRAFT

CROSS-REFERENCES TO RELATED APPLICATIONS

This application claims the benefit of the U.S. Provisional Application No. 61/415,976, filed on Nov. 22, 2010, and of the German patent application No. 10 2010 061 721.0 filed on Nov. 22, 2010, the entire disclosures of which are incorporated herein by way of reference.

FIELD OF THE INVENTION

The present invention relates to an energy supply network for an aircraft or spacecraft, to a method for supplying electrical loads with energy in an aircraft or spacecraft, and to an aircraft or spacecraft.

BACKGROUND OF THE INVENTION

Although applicable to any aircraft and spacecraft, the present invention and the problems on which it is based are explained in greater detail in relation to aircraft.

Modern aircraft, in particular passenger jumbo jets or "twin-aisle" aircraft, comprise a plurality of electrical loads. These loads comprise for example the control electronics of the aircraft, the cabin lighting, the electronic devices of the in-flight entertainment (IFE), the galley and the like.

In modern aircraft, an increasingly complex energy supply network is required for supplying these electrical loads. Conventional energy supply networks of this type are shown for example in DE 102008043626 A1 and US 2008100136 A1. An energy supply network of this type consists of a plurality of generators which are driven by the engines of the aircraft, a central energy control device or primary energy distribution, a plurality of secondary distributors, the actual electrical loads and the corresponding supply lines.

The electrical energy generated by the electrical generators is conveyed to the electrical loads in the aircraft via supply lines and via distributors. In modern jumbo jets, for example the Airbus A380-800, having a total length of over 70 meters, there are a large number of electrical loads. Owing to the large aircraft length of jumbo jets of this type, expensive, increasingly complex cabling is required. Since the primary energy distribution is currently usually placed at the front of the aircraft cabin and the electrical loads are mostly connected to said primary energy distribution via a point-to-point connection, a plurality of electrical supply lines are required in order to be able to connect all the electrical loads to the energy supply network.

To reduce this cabling cost in modern aircraft, secondary distributors are provided which obtain a controlled supply voltage from the primary energy distribution and forward it to the electrical loads, which for example are connected to the primary energy distribution via common supply lines. If the individual electrical loads in energy supply networks of this type are supplied via these secondary distributors, the cabling cost is reduced considerably.

However, the use of the above-described energy supply network in jumbo jets has the result that electrical supply lines from all energy generating devices, for example also from an auxiliary generator in the tail region of the jumbo jet, must be laid to the primary energy distribution in the front region of the aircraft. If an electrical load in the tail region of the aircraft, for example an electrical load of a galley, must be supplied with electrical energy, it is necessary to lay additional electrical supply lines along the entire length of the aircraft in order to connect the respective electrical load, or a secondary distributer which supplies a group of loads with electrical energy, to the primary energy distribution located in the front region of the aircraft. This results in high cabling costs and a considerable increase in the weight of the aircraft.

Figure 5:
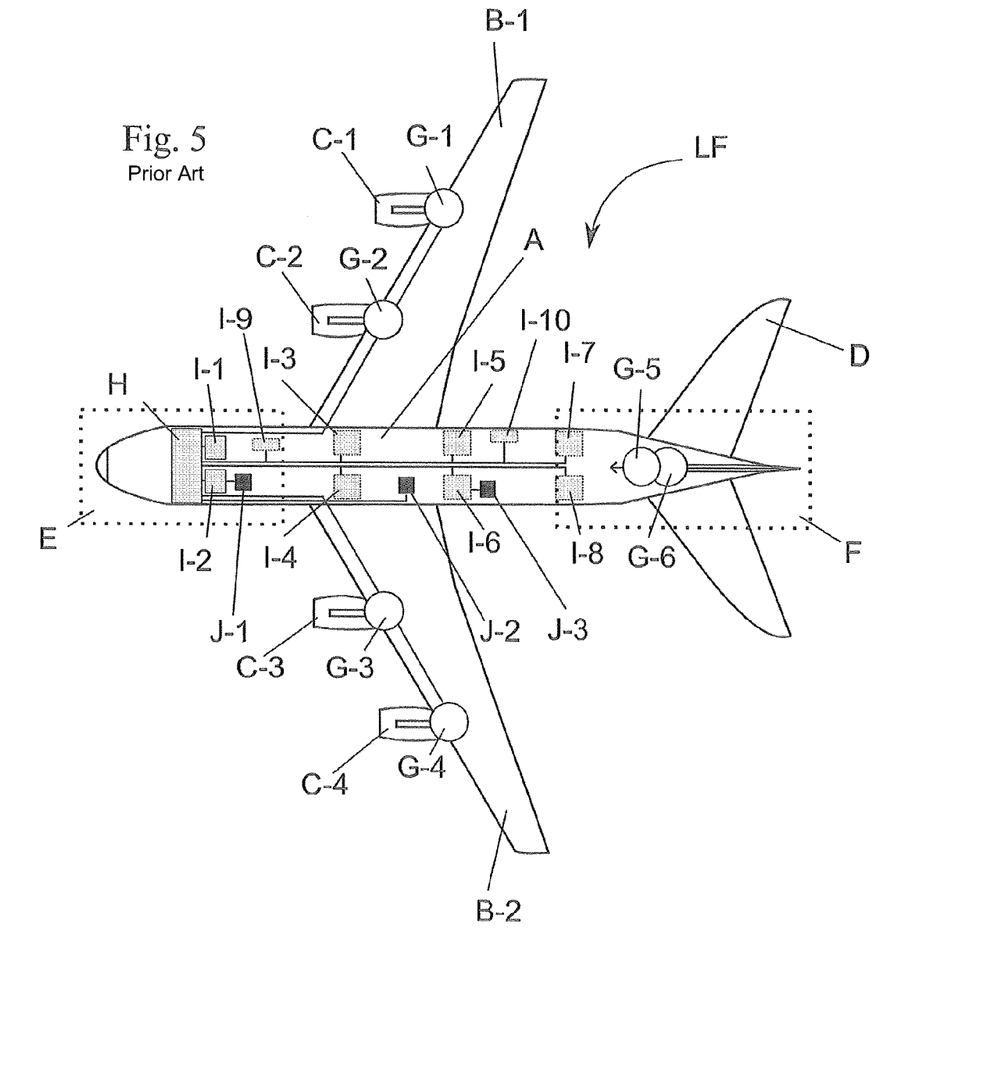
FIG. 5 is a schematic drawing of an aircraft comprising a conventional energy supply network.

FIG. 5 shows a schematic view of an aircraft or spacecraft LF comprising a conventional energy supply network of this type.

The aircraft or spacecraft LF in FIG. 5 comprises an aircraft fuselage A, to which two wings B-1, B-2, each having two engines C-1 to C-4, and a tail unit D are attached. A front region E and a tail region F are also provided in the aircraft LF. In the aircraft LF in FIG. 5, four generators G-1 to G-4, which are each provided on one of the engines C-1 to C-4 of the aircraft LF, and two auxiliary or "APU" (Auxiliary Power Unit) generators G-5, G-6 in the tail region F of the aircraft LF are provided. The generators G-1 to G-6 are connected to a central energy control device H or "primary energy distribution" H. In the case of the auxiliary generators G-5, G-6, this is shown by an arrow in the direction of the front region E of the aircraft LF. Furthermore, eight secondary distributors I-1 to I-8 and two secondary distributors for cargo loads I-9, I-10 are connected to the central energy control device H. Of these eight secondary distributors I-1 to I-8, preferably four in each case, for example four secondary distributors I-2, I-4, I-6, I-8 on the left-hand side and four secondary distributors I-1, I-3, I-5, I-7 on the right-hand side of the aircraft fuselage A, are coupled to the central energy control device H by a common electrical line. The two secondary distributors for cargo loads I-9, I-10 are also coupled to the central energy control device H by the line of the right-hand secondary distributors I-1, I-3, I-5, I-7. Finally, two loads J-1, J-3 or electrical loads J-1, J-3 are integrated with the first two of the left-hand secondary distributors I-2, I-6 and one load J-2 is directly connected to the energy control means H.

In the aircraft or spacecraft LF shown in FIG. 5, all the secondary distributors I-1 to I-10 and some of the electrical loads J-2 are supplied directly by the central energy control device H. Other electrical loads J-1, J-3 are supplied by one of the secondary distributors I-1 to I-10, which draw electrical energy from the central energy control means H and distribute this to individual electrical loads J-1, J-3, for example electrical loads of a galley, of a cabin announcement system or the like. For all generators G-1 to G-6 and all components supplied with electrical energy by the central energy control device H, lines must be laid from their installation site to the central energy control device H. In the aircraft LF shown in FIG. 5 it can clearly be seen that, for example for supplying the secondary distributors I-7, I-8, an electrical line from the energy control device H must be laid through the entire aircraft fuselage A. In the least favourable case, electrical energy is generated by the auxiliary generators G-5, G-6 and transported via electrical lines to the energy control device H in the front region E of the aircraft LF. This electrical energy is then transported back through the entire aircraft fuselage A to the secondary energy distributors I-7, I-8. Laying electrical cables from the tail region F of the aircraft LF to the front region E of the aircraft LF and back results in considerable planning and cabling costs and to a high weight for the cabling of the aircraft LF.

An extension, modification or adaptation of the energy supply network is also made more difficult by the predetermined architecture of the conventional energy supply network. If for example the energy supply network of the aircraft LF is to be extended and additional electrical loads integrated into the energy supply network, the central energy control device H must be adapted to the new, larger maximum electrical power. Depending on the position of the additional electrical loads inside the aircraft LF, all the cabling inside the aircraft LF must also be adapted. This results in high development and planning costs for each additional electrical load which is to be added to the energy supply network of the aircraft LF. A conventional energy supply network of this type is therefore not easily adaptable. The current conventional architecture of an energy supply network for an aircraft or spacecraft or an aircraft LF is therefore not very flexible for adaptations of this type.

SUMMARY OF THE INVENTION

An aspect of the invention is therefore to provide a flexible energy supply inside an aircraft or spacecraft and in particular inside a jumbo jet.

This aspect is achieved by an energy supply network, a method for supplying electrical loads with energy and an aircraft or spacecraft according to the invention.

Accordingly, the following are provided:
- an energy supply network for an aircraft or spacecraft, comprising at least one energy generating device for generating electrical energy; at least two energy control devices, at least one of which is coupled to at least one of the energy generating devices and which are adapted each to provide a controlled supply voltage so as to supply electrical loads located in the aircraft with energy; and a high-voltage direct current transmission device, which couples the at least two energy control devices to one another by means of high-voltage direct current transmission;
- a method for supplying electrical loads in an aircraft or spacecraft with energy, in particular by means of an energy supply network according to the invention, comprising the following method steps: providing a controlled supply voltage for supplying electrical loads located in the aircraft or spacecraft via at least a first energy control device; and transmitting electrical energy from one of the first energy control devices to a further energy control device via a high-voltage direct current transmission device;
- an aircraft or spacecraft, in particular passenger jumbo jet or twin-aisle aircraft, comprising an aircraft fuselage which comprises a plurality of electrical loads, which are distributed in the aircraft fuselage and are each electrically coupled to an energy control device and/or a secondary distributor; at least one energy generating device for generating electrical energy, which is electrically coupled to an energy control device; and an energy supply network according to the invention.

The knowledge on which the present invention is based is that in increasingly large aircraft and spacecraft, or aircraft having a plurality of electrical loads and a central provision of a controlled supply voltage, the cost of the cabling for the components of the energy supply network and the complexity of the energy supply network is becoming so high that conventional energy supply networks can no longer be used efficiently.

The idea on which the present invention is based consists in providing a locally organised energy supply network for an aircraft or spacecraft. In a local energy supply network of this type, at least two energy control devices are provided which can supply the electrical loads directly or indirectly via secondary distributors. The energy control devices also have an interface, which according to the invention is configured as a high-voltage direct current transmission device and via which these energy control devices can exchange or transmit electrical energy among themselves. This high-voltage direct current transmission device also serves as an "intermediate circuit" and makes it possible to couple together energy control devices whose alternating current energy generating devices are not synchronised and exchange electrical energy between them.

Through this local architecture of the energy supply network and through the use of at least two energy control devices, electrical loads can be supplied by an energy control device other than the energy control device located at the front of the aircraft. Additional energy generating devices, for example generators located in the tail region of the aircraft, can also be connected to an energy control device which is closer to these than the energy control device located in the front region of the aircraft. It is no longer necessary to lay electrical supply lines from the energy control device in the front region of the aircraft to each individual load or to each individual energy generating device. This results not only in a simplified construction of the energy supply network but also in a considerable weight saving accompanied by a reduction in the fuel consumption of the aircraft.

The high-voltage direct current transmission device preferably transmits a direct current at a higher voltage that is usual in conventional aircraft. The voltage at which the high-voltage direct current transmission device transmits electrical power is up to +/−600 volts. The voltage is preferably +/−270 volts. The use of such a high voltage results in substantially lower electrical currents on the electrical lines of the high-voltage direct current transmission device than is usual in conventional aircraft. If the diameter of the electrical lines is reduced and thus adapted to these lower electrical currents or current amplitudes, this results in a further considerable weight saving in the laid electrical lines of the energy supply network and thus of the entire aircraft.

The local architecture of the energy supply network also makes it possible to adapt the energy supply network to changing requirements in an extremely flexible manner. For example, if the existing energy control devices are loaded to their maximum capacity when all the electrical loads are operating and if further electrical loads are to be integrated into the energy supply network, a further energy control device can for example be coupled to the high-voltage direct current transmission device in order to supply further electrical loads with electrical energy. It is thus not necessary to adapt the existing energy control devices. The energy supply network can thus be adapted or extended in an efficient and prompt manner.

Finally, the architecture according to the invention for an energy supply network offers a simple possibility for integrating alternative energy generating devices, for example a fuel cell, into the energy supply network. The energy control device to which the fuel cell is connected can also distribute the electrical energy provided by the fuel cell to other energy control devices via the high-voltage direct current transmission device. A separate inverter and direct cabling of the fuel cell to an energy control device remote from the fuel cell are thus not necessary. The present energy supply network thus makes it possible to integrate alternative energy generating devices into an existing energy supply network at a low development cost.

Advantageous configurations and developments emerge from the further dependent claims and from the description with reference to the figures of the drawings.

In a possible embodiment, the at least two energy control devices each comprise at least one power converter which is coupled to the high-voltage direct current transmission device. This makes possible to exchange energy effectively between the energy control devices and to transmit energy between two energy control devices having non-synchronised energy generators. In this case, the power converter can be formed as a rectifier and/or as an inverter. Integrating the function of a rectifier and the function of an inverter in a single power converter makes it possible to construct an energy control device in an advantageous manner.

In another embodiment, the energy supply network has a first mode of operation, in which the power converter operates as a rectifier and transmits energy to another energy control device via the high-voltage direct current transmission device, and a second mode of operation, in which the power converter operates as an inverter when the power converter receives electrical energy from a second energy control device via the high-voltage direct current transmission device. Because the two modes of operation are integrated in a power converter, a power converter can be operated bidirectionally and the power converter can both emit electrical energy and receive electrical energy.

In yet another embodiment, a main energy control device is assigned to the generators on the engines and/or an auxiliary energy control device is assigned to the generators on an auxiliary engine. The assignment of particular generators to particular energy control devices allows optimised cabling between the generators and the respective energy control device and thus a simpler and more advantageous construction of the energy supply network.

In another alternative embodiment, an energy generating device is configured as an electrical generator or a fuel cell. The possibility of being able to use different energy generating devices in the energy supply network increases the flexibility and allows rapid and thus advantageous integration of new technologies into an existing energy supply network.

In another embodiment, at least one electrical supply line is provided, and is adapted to couple stationary electrical loads to one of the energy control devices via an end winding or via a point-to-point connection. By coupling electrical loads directly to an energy control device, secondary distributors can be saved. In particular for electrical loads which are located in the immediate vicinity of an energy control device, an end winding of this type results in considerable weight and cost savings owing to the considerably lesser cabling.

In another embodiment, an electrical load is coupled to whichever one of the energy control devices respectively results in the shortest connection length of the electrical supply lines. This makes it possible to optimise the cabling, which leads to a reduction in the weight and complexity of the cabling in the aircraft or spacecraft and thus to a cost reduction.

In another embodiment, at least one secondary distributor is provided, arranged between the energy control device and at least one electrical load, and is configured to pass on energy from an energy control device to at least one electrical load. This makes it possible for electrical loads and or groups of loads which are not installed or provided in the vicinity of an energy control device in the aircraft to be supplied with electrical current effectively. Instead of laying a separate supply line to each of the electrical loads, a single supply line to the respective secondary distributer can be provided. Only relatively short point-to-point connections then need to be laid from this secondary distributor to the individual electrical loads. This results in a reduction in the cabling cost and thus also a weight and cost reduction.

If additional electrical loads are integrated into an energy supply network, during planning and cabling it can be weighed up for each electrical load whether it is more advantageous to couple the respective load directly to an energy control device or to a secondary distributor. This is done according to need and for example optimised depending on the required cabling cost.

In another embodiment, at least one connection device is provided and is configured to couple at least two secondary distributors and/or electrical loads to an energy control device via a shared supply line. By cabling at least two secondary distributors by means of a series or parallel circuit, one of two supply lines which would be required in order to supply the secondary distributors separately can be saved. This also leads to a significant weight and cost reduction for the cabling.

In another embodiment, the energy control devices each comprise an output power sensor and an input power sensor, which detect the power emitted and received respectively by the energy control device, the energy control devices compensating power between them via the high-voltage direct current transmission device as a function of the detected received power and/or the detected emitted power. The energy exchange between the energy control devices makes it possible to connect electrical loads to the energy control device which is located closest to the respective load, and to supply this electrical load with current in the event that, for example, insufficient electrical energy is available to the energy control device without the energy exchange. It is thus possible to dispense with expensive cabling between the electrical load and an energy control device which has sufficient energy reserves to supply the respective load, but may be far away from it. This results in a simpler and thus lighter energy supply network.

In another embodiment, a decoupled operation is provided, in which there is no energy exchange between the energy control devices.

In another embodiment, a coupled operation is provided, in which there is energy exchange between the energy control devices.

The possibility of operating the energy control device both in a coupled operation and in a decoupled operation makes it possible to adapt the energy supply network in a flexible manner to the conditions in different aircraft types or aircraft variants.

The above-mentioned configurations and developments can be combined with one another. Further possible configurations, developments and implementations of the invention also include not explicitly mentioned combinations of features of the invention which are described above or below with reference to the embodiments. In particular, the person skilled in the art will also add individual aspects as improvements or supplements to the respective basic form of the present invention.

BRIEF DESCRIPTION OF THE DRAWINGS

The invention will be described in greater detail in the following by way of embodiments, with reference to the appended figures of the drawings, in which.

In the figures, like reference numerals denote like or functionally equivalent components unless stated otherwise.

DETAILED DESCRIPTION OF THE PREFERRED EMBODIMENTS

Figure 1:
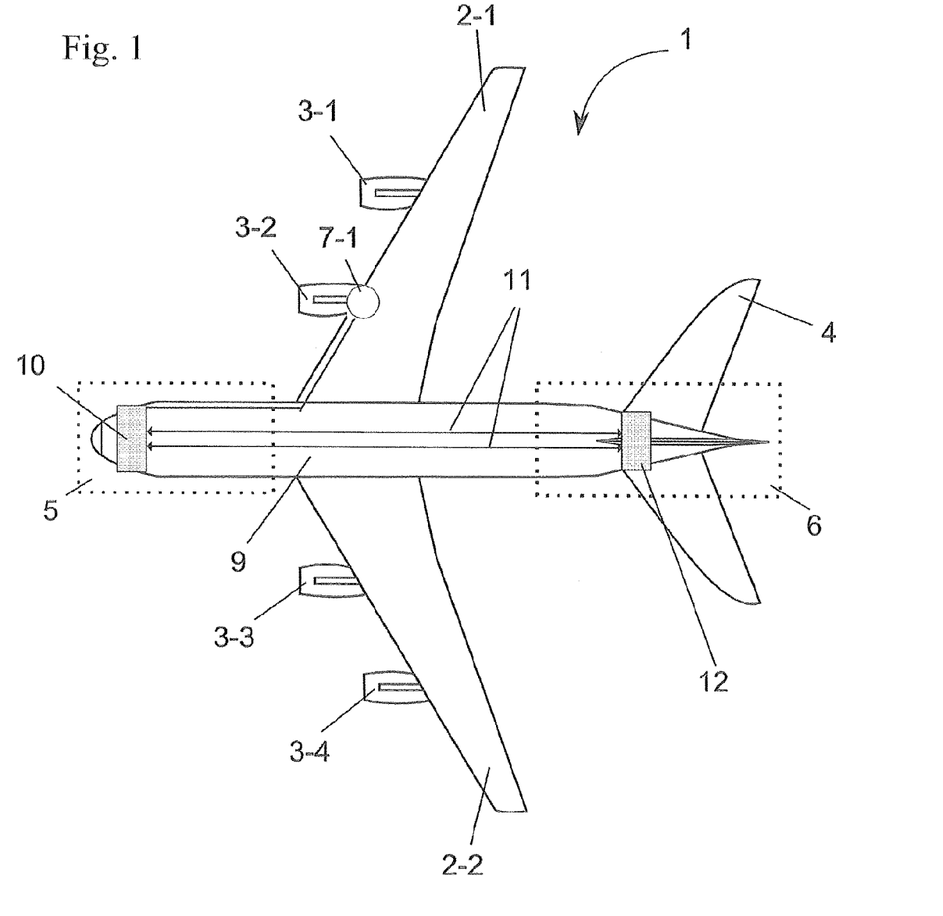
FIG. 1 is a schematic drawing of an aircraft comprising one possible embodiment of an energy supply network according to the invention.

FIG. 1 is a schematic drawing of an aircraft 1 comprising one possible embodiment of an energy supply network according to the invention.

FIG. 1 shows an aircraft 1 comprising an aircraft fuselage 9, to which two wings 2-1, 2-2 are fixed, two turbines 3-1 and 3-2 being attached to the right wing 2-1 and two turbines 3-3, 3-4 being attached to the left wing 2-2. The aircraft 1 has a tail unit 4. The aircraft fuselage 9 comprises a front region 5 and a tail region 6. A generator 7-1 and two energy control devices 10, 12 as well as a high-voltage direct current transmission device 11 are further provided in the aircraft 1. In the embodiment shown, the generator 7-1 is located on a turbine 3-2 of the aircraft 1, said turbine being attached to the right aerofoil 2-1 of the aircraft 1, and is coupled directly to the energy control device 10 in the front region 5 of the aircraft 1. The energy control device 10 is connected via the high-voltage direct current transmission device 11 to the second energy control device 12, which is located in the tail region 6 of the aircraft 1. In this embodiment, the energy control device 10, which is provided in the front region 5 of the aircraft 1, obtains electrical energy from the generator 7-1. If the energy control device 12 in the tail region of the aircraft 1 requires electrical energy, the energy control device 10 in the front region 5 of the aircraft 1 transmits electrical energy via the high-voltage direct current transmission device 11 to the energy control device 12 in the tail region 6 of the aircraft 1.

In one possible embodiment, the energy control devices 10, 12 are coupled to one another via a communicative connection, so as to communicate the amount of required or excess electrical energy between them. This communicative connection may for example be a communication network which is already present in the aircraft 1. This communication network may for example be an Ethernet-based communication network. In an alternative embodiment, the communication network may be a communication network based on the CAN (controller area network) standard.

In the embodiment shown in FIG. 1, the generator 7-1 generates an alternating voltage of 230 volts at a frequency of 400 Hz. In a further embodiment, the generator 7-1 can also generate an alternating voltage having an amplitude in a range of 100 volts to 500 volts, preferably in a range of 150 volts to 380 volts. In a further embodiment, the frequency of the alternating voltage generated by the generator 7-1 may be in a range of 200 Hz to 1500 Hz, preferably in a range of 360 Hz to 900 Hz.

Figure 2:
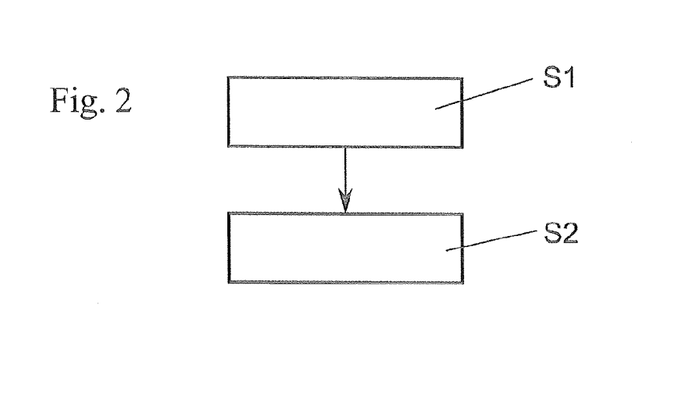
FIG. 2 is a flow diagram of an embodiment of a method according to the invention.

FIG. 2 is a simple flow diagram of an example of one possible embodiment of a method for supplying the electrical loads in an aircraft 1 with electrical energy according to the present invention.

Figure 3:
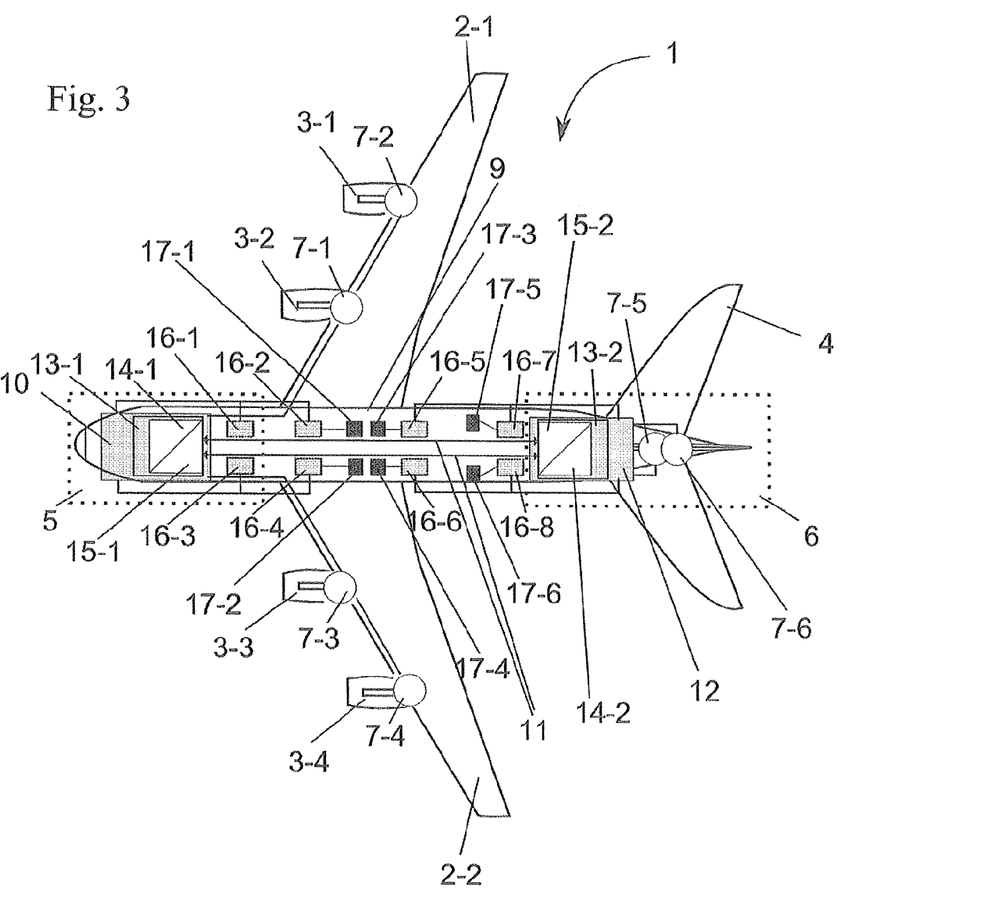
FIG. 3 is a schematic drawing of an aircraft comprising an embodiment of an energy supply network according to the invention.

In a first step S1, a controlled supply voltage is provided via at least one energy control device 10, 12. In one possible embodiment of the invention, this takes place in that the at least one energy control device 10, 12 converts electrical energy from at least one generator 7-1 to 7-6, as shown in FIG. 3, 4, and/or at least one alternative energy generating device, such as a fuel cell, into a controlled supply voltage. This controlled supply voltage serves to supply electrical loads 17-1 to 17-16 from FIGS. 3 and 4, for example lighting, air conditioning or cockpit instruments, located in the aircraft 1. In a second step S2, electrical energy is transmitted from a first energy control device 10, 12 to a second energy control device 12, 10 via the high-voltage direct current transmission device 11. If supplying the electrical loads connected to the second energy control device 12, 10 requires more electrical power than is available to the second energy control device 12, 10, it can request the lacking electrical energy from a first energy control device 10, 12. Thereupon, the first energy control device 10, 12 transmits the requested energy to the second energy control device 12, 10 via the high-voltage direct current transmission device 11.

If an aircraft 1 is at a terminal of an airport, it is possible for example that there may be only a single auxiliary generator 7-5, 7-6 in operation. In this case, the energy control device 12, to which the auxiliary generators 7-5, 7-6 are connected, supplies the further energy control devices 10 with electrical energy via the high-voltage direct current transmission device 11, and they convert said energy into alternating current and supply it to the electrical loads 17-1 to 17-16 as a controlled supply voltage. The auxiliary generators 7-5, 7-6 are electrical generators which are driven by what is known as an auxiliary engine. An auxiliary engine is not configured to drive the aircraft. It is merely used to generate electrical energy by means of one or more auxiliary generators 7-5, 7-6.

In one embodiment, a fuel cell provided as an alternative energy generating device may for example supply electrical energy having a voltage of ±270 volts. Since this provided voltage corresponds to the voltage at which the high-voltage direct current transmission device 11 transmits electrical power, no expensive voltage transformation is required to connect a fuel cell to the energy supply network. In a further embodiment, a fuel cell may also provide a voltage of up to ±600 volts. This is particularly advantageous if the voltage at which the high-voltage direct current transmission device 11 transmits is changed or increased. In this way, simple connection of the fuel cell to the energy supply network is still possible when the voltage level of the high-voltage direct current transmission device 11 has changed.

FIG. 3 is a schematic drawing of an aircraft 1 according to a further embodiment of the energy supply network according to the invention.

FIG. 3 likewise shows an aircraft 1, the aircraft 1 having four generators 7-1 to 7-4 on the turbines 3-1 to 3-4 of the aircraft 1 and two auxiliary generators 7-5, 7-6 in the tail region 6 of the aircraft 1. Further, eight secondary distributors 16-1 to 16-8 are provided in the aircraft 1. Further, preferably six electrical loads 17-1 to 17-6, for example three electrical loads 17-1, 17-3, 17-5 on the right side and three electrical loads 17-2, 17-4, 17-6 on the left side of the aircraft fuselage 9, are respectively connected to secondary distributors 16-2, 16-5, 16-7, 16-4, 16-6, 16-8. Reference numerals 10, 12 denote two energy control devices, of which one energy control device 10 is placed in the front region 5 of the aircraft 1 and one energy control device 12 is placed in the tail region 6 of the aircraft 1 in front of the auxiliary generators 7-5, 7-6. The two energy control devices 10, 12 each comprise a current transformer 13-1, 13-2, which consists of an alternating current interface 14-1, 14-2 and a high-voltage direct current interface 15-1, 15-2. The two energy control devices 10, 12 are further interconnected via the high-voltage direct current transmission device 11. In FIG. 3, four of the eight secondary distributors 16-1 to 16-4 and 16-5 to 16-8 are connected to each of the two energy control devices 10, 12. In each case, two of the four secondary distributors 16-1, 16-2; 16-3, 16-4; 16-5, 16-7; 16-6, 16-8 are connected to an energy control device 10, 12 via a shared supply line. This type of connection of the secondary distributors 16-1 to 16-8, in which the plurality of secondary distributors 16-1 to 16-8 are supplied with electrical energy via a shared electrical line, forms what is known as a parallel or series connection, as opposed to a star connection.

In the energy supply network shown in FIG. 3, the high-voltage direct current transmission device 11 transmits a direct current at a voltage for example +/−270 volts. In further embodiments of the energy supply network the high-voltage direct current transmission device 11 can transmit electrical energy at a voltage other than +/−270 volts. In this case, the voltage may be in a range of up to +/−600 volts. If a higher voltage than +/−270 volts is selected, the currents or current amplitudes which are transmitted via the electrical lines of the high-voltage direct current transmission device 11 are reduced further. This also makes further reduction of the cross-section of the electrical lines possible, and thus makes it possible to save on weight.

FIG. 3 illustrates, by way of example, how the corresponding embodiment of the energy supply network according to the invention can reduce the cabling expense in an aircraft 1. The secondary distributors 16-1 to 16-4 which are placed closer to the front energy control device 10 are supplied with electrical energy by said device, and the secondary distributors 16-5 to 16-8 which are placed closer to the rear energy control device 12 are supplied with electrical energy by the rear energy control device 12. Likewise, the auxiliary generators 7-5, 7-6 are connected directly to the rear energy control device 12, and this makes much shorter electrical lines possible than if the electrical loads 16-5 to 16-8 and the auxiliary generators 7-5, 7-6 were connected to the front energy control device 10.

Figure 4:
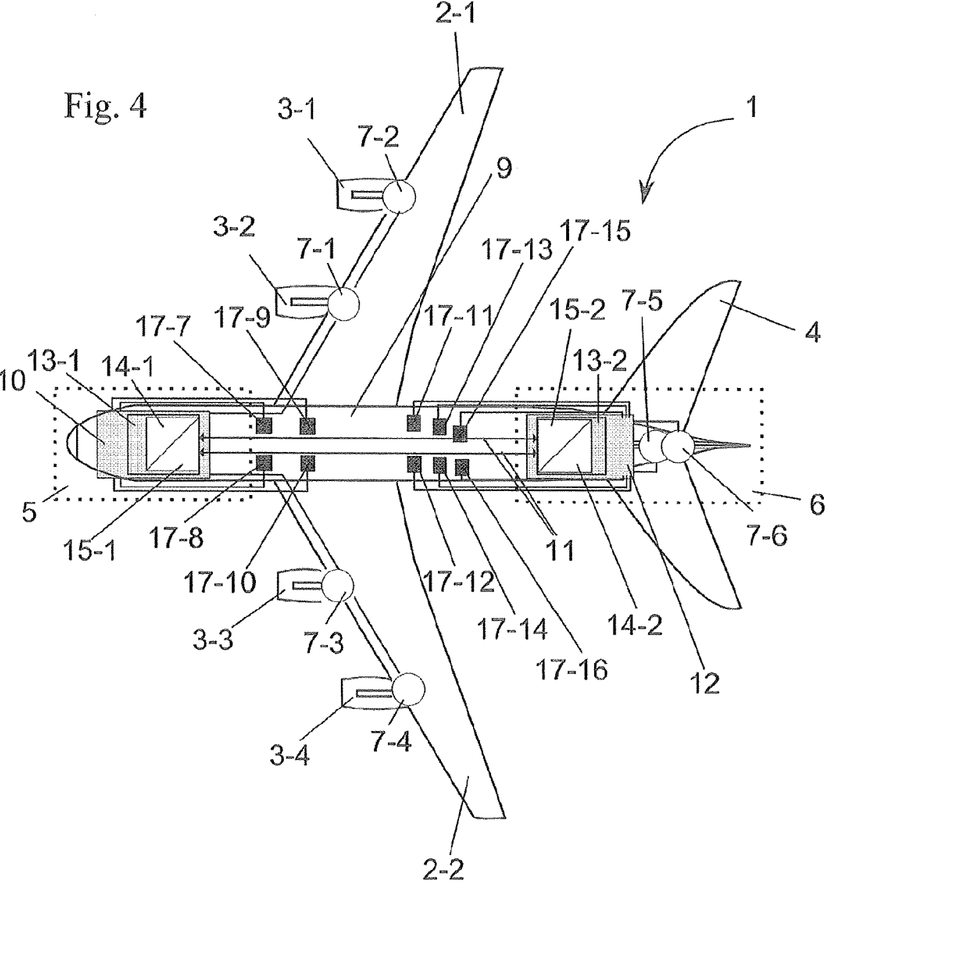
FIG. 4 is a schematic drawing of an aircraft comprising a further embodiment of an energy supply network according to the invention.

In further embodiments, more than the two energy control devices 10, 12 shown in FIG. 1, 3, 4 are possible. In such a case, the further energy control devices 10, 12 could be coupled directly to the high-voltage direct current transmission device 11, without further long electrical lines having to be laid in the aircraft 1. This provides further cost and weight savings.

FIG. 4 is a schematic drawing of an aircraft 1 comprising a further embodiment of an energy supply network according to a preferred embodiment of the present invention.

In FIG. 4, the construction of the energy supply network in the aircraft 1 corresponds most closely to the construction from FIG. 3, comprising four generators 7-1 to 7-4, two auxiliary generators 7-5, 7-6, two energy control devices 10, 12, which each comprise a current transformer 13-1, 13-2 comprising an alternating current interface 14-1, 14-2 and a high-voltage direct current interface 15-1, 15-2. In the embodiment shown in FIG. 4, too, one energy control device 10 is arranged in the front region 5 and one energy control device 12 is arranged in the tail region 6 of the aircraft 1, and the two energy control devices 10, 12 are coupled to one another via a high-voltage direct current transmission device 11.

Unlike the embodiment shown in FIG. 3 of the energy supply network, the embodiment shown in FIG. 4 of the energy supply network does not comprise secondary distributors 16-1 to 16-8, and instead ten electrical loads 17-7 to 17-16 are shown. In this context, four electrical loads 17-7 to 17-10 are located in the front half of the aircraft 1 and six of the electrical loads 17-11 to 17-16 are located in the rear half or the aircraft 1. According to the present embodiment, each electrical load 17-7 to 17-16 is connected via a direct point-to-point connection to whichever of the two energy control devices 10, 12 provides the shortest line length for the respective electrical load 17-7 to 17-16. The connection shown in this case, known as a star connection, of the electrical loads 17-7 to 17-16 to the two energy control devices 10, 12 makes it possible to dispense with secondary distributors 16-1 to 16-8 and to keep the lengths of the electrical lines to a minimum nevertheless.

Although the present invention has been described by way of preferred embodiments, it is not limited thereto, but can be modified in various ways. In particular, the invention can be altered or modified in numerous ways without departing from the central idea of the invention.

In further embodiments, it is possible to use both the parallel or serial connection and the star connection in an aircraft 1. The star connection is preferably used for electrical loads 17-1 to 17-16 which are positioned in the direct vicinity of an energy control device 10, 12. By contrast, secondary distributors 16-1 to 16-8 are preferably used if a plurality of electrical loads 17-1 to 17-16 provided in the same location are to be supplied with electrical energy. This may for example be the case for an on-board kitchen. As electrical loads, an on-board kitchen of this type may comprise a plurality of microwaves, fridges, lighting devices and other electrical loads. In such a case, what is decisive is whether using a secondary distributor 16-1 to 16-8 leads to a lower expense and a lower weight than a direct star connection of the individual electrical loads 17-1 to 17-16 to one of the energy control devices 10, 12.

In further possible embodiments, the aircraft 1 may comprise an alternative energy generating device, for example a fuel cell, instead of the auxiliary generators 7-5, 7-6. A fuel cell generates a direct current and therefore cannot be connected directly to the electrical loads 17-1 to 17-6 or to a generator input of an energy control device 10, 12. For this reason, a fuel cell is connected to a direct current input of the power converter 13-1, 13-2 of an energy control device 10, 12. In this case, only slight adjustments to the corresponding energy control device 10, 12 are required, since the current controller of the energy control device 10, 12 already has a high-voltage direct current interface 15-1, 15-2.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE NUMERALS

1 aircraft
2-1 right wing 2-2 left wing
3-1 turbine
3-2 turbine
3-3 turbine
3-4 turbine
4 tail unit
5 front region
6 tail region
7-1 generator
7-2 generator
7-3 generator
7-4 generator
7-5 generator
7-6 generator
9 aircraft fuselage
10 energy control device
11 high-voltage direct current transmission device
12 energy control device
13-1 power converter
13-2 power converter
14-1 alternating current interface
14-2 alternating current interface
15-1 high-voltage direct current interface
15-2 high-voltage direct current interface
16-1 secondary distributor
16-2 secondary distributor
16-3 secondary distributor
16-4 secondary distributor
16-5 secondary distributor
16-6 secondary distributor
16-7 secondary distributor
16-8 secondary distributor
17-1 electrical load
17-2 electrical load
17-3 electrical load
17-4 electrical load
17-5 electrical load
17-6 electrical load
17-7 electrical load
17-8 electrical load
17-9 electrical load
17-10 electrical load
17-11 electrical load
17-12 electrical load
17-13 electrical load
17-14 electrical load
17-15 electrical load
17-16 electrical load
S1 method step
S2 method step
A aircraft fuselage
B-1 wing
B-2 wing
C-1 turbine
C-2 turbine
C-3 turbine
C-4 turbine
D tail unit
E front region
F tail region
G-1 generator
G-2 generator
G-3 generator
G-4 generator
G-5 generator
G-6 generator
H primary distributor
I-1 secondary distributor
I-2 secondary distributor
I-3 secondary distributor
I-4 secondary distributor
I-5 secondary distributor
I-6 secondary distributor
I-7 secondary distributor
I-8 secondary distributor
I-9 secondary distributor
I-10 secondary distributor
J-1 electrical load
J-2 electrical load
J-3 electrical load

The invention claimed is:

1. An energy supply network for an aircraft or spacecraft, comprising:
at least one energy generating device for generating electrical energy;
at least two energy control devices, at least one of which is coupled directly to the at least one energy generating device and which are adapted each to provide a controlled supply voltage so as to supply electrical loads located in the aircraft with energy; and
a high-voltage direct current transmission device which couples the at least two energy control devices to one another by means of high-voltage direct current transmission,
wherein the at least two energy control devices each comprise an output power sensor and an input power sensor, which detect the power emitted and received respectively by such energy control device, the energy control devices compensating electrical energy between them via the high-voltage direct current transmission device as a function of at least one of the detected received power and the detected emitted power.

2. The energy supply network according to claim 1, wherein the at least two energy control devices each comprise at least one power converter which is coupled to the high-voltage direct current transmission device.

3. The energy supply network according to claim 1, wherein the energy generating device is configured as one of an electrical generator and a fuel cell.

4. The energy supply network according to claim 1, wherein one of the energy control devices is configured as a main energy control device, which is assigned to the energy generating devices on engines of the aircraft.

5. The energy supply network according to claim 1, wherein a further energy control device is configured as an auxiliary energy control device, which is assigned to at least one of at least one a-generator on an auxiliary engine and at least one fuel cell in a tail region of the aircraft.

6. The energy supply network according to claim 1, wherein at least one electrical supply line is provided and is adapted to couple stationary electrical loads to one of the energy control devices via a star connection.

7. The energy supply network according to claim 6, wherein the stationary electrical loads are coupled to whichever one of the two energy control devices results in a shortest connection length of an electricity supply line.

8. The energy supply network according to claim 1, wherein at least one secondary distributor is provided, arranged between one of the at least two energy control devices and at least one electrical load, and is configured to pass on energy from that energy control device to at least one coupled electrical load.

9. The energy supply network according to claim 8, wherein at least one connection device is provided and is configured to couple at least one of at least two secondary distributors and electrical loads to an energy control device via a shared supply line.

10. An aircraft or spacecraft, comprising:
an aircraft fuselage which comprises a plurality of electrical loads, which are distributed in the aircraft fuselage and are each electrically coupled to at least one of an energy control device and a secondary distributor;
at least one energy generating device for generating electrical energy, which is electrically coupled to an energy control device; and
an energy supply network according to claim 1.

11. A method for supplying electrical loads in an aircraft or spacecraft with energy by means of an energy supply network comprising:
at least one energy generating device for generating electrical energy;
at least two energy control devices, at least one of which is coupled directly to the at least one energy generating device and which are adapted each to provide a controlled supply voltage so as to supply electrical loads located in the aircraft with energy; and
a high-voltage direct current transmission device which couples the at least two energy control devices to one another by means of high-voltage direct current transmission, comprising the following method steps:
providing a controlled supply voltage for supplying electrical loads located in the aircraft or spacecraft via at least a first energy control device; and
transmitting electrical energy from a first of the energy control devices to a second of the energy control devices via a high-voltage direct current transmission device,
wherein, in a first mode of operation, a power converter of the first of the energy control devices operates as a rectifier and transmits energy to another of the energy control devices via the high-voltage direct current transmission device; and
wherein, in a second mode of operation, the power converter of the one of the energy control devices operates as an inverter when the power converter receives electrical energy from a second of the energy control devices via the high-voltage direct current transmission device.

12. The method according to claim 11, wherein a decoupled operation is provided, in which there is no energy exchange between the energy control devices.

13. The method according to claim 11, wherein a coupled operation is provided, in which there is energy exchange between at least two of the energy control devices.

14. A method for supplying electrical loads in an aircraft or spacecraft with energy by means of an energy supply network comprising:
at least one energy generating device for generating electrical energy;
at least two energy control devices, at least one of which is coupled directly to the at least one energy generating device and which are adapted each to provide a controlled supply voltage so as to supply electrical loads located in the aircraft with energy; and
a high-voltage direct current transmission device which couples the at least two energy control devices to one another by means of high-voltage direct current transmission, comprising the following method steps:
providing a controlled supply voltage for supplying electrical loads located in the aircraft or spacecraft via at least a first energy control device; and
transmitting electrical energy from a first of the energy control devices to a second of the energy control devices via a high-voltage direct current transmission device,
wherein transmitting the electrical energy comprises the following substeps:
detecting one of the received and emitted electrical power of at least the first and second energy control devices;
requesting an amount of energy by the second energy device if this second energy device requires a larger amount of energy than is available; and
transmitting this requested amount of energy from the first energy control device to the second energy control device via the high-voltage direct current transmission device.

* * * * *